United States Patent
Narendra Trivedi et al.

(10) Patent No.: US 10,102,370 B2
(45) Date of Patent: Oct. 16, 2018

(54) TECHNIQUES TO ENABLE SCALABLE CRYPTOGRAPHICALLY PROTECTED MEMORY USING ON-CHIP MEMORY

(71) Applicant: INTEL CORPORATION, Santa Clara, CA (US)

(72) Inventors: Alpa Narendra Trivedi, Hillsboro, OR (US); Siddhartha Chhabra, Hillsboro, OR (US); David Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 175 days.

(21) Appl. No.: 14/977,391

(22) Filed: Dec. 21, 2015

(65) Prior Publication Data
US 2017/0177862 A1    Jun. 22, 2017

(51) Int. Cl.
*G06F 3/06* (2006.01)
*G06F 21/55* (2013.01)
*G06F 12/0891* (2016.01)
*G06F 12/0893* (2016.01)
*G06F 12/14* (2006.01)
*G06F 21/60* (2013.01)
*G06F 12/1009* (2016.01)
*G06F 21/78* (2013.01)

(52) U.S. Cl.
CPC .......... *G06F 21/554* (2013.01); *G06F 3/0604* (2013.01); *G06F 3/0632* (2013.01); *G06F 3/0673* (2013.01); *G06F 12/0891* (2013.01); *G06F 12/0893* (2013.01); *G06F 12/1009* (2013.01); *G06F 12/1408* (2013.01); *G06F 21/602* (2013.01); *G06F 21/78* (2013.01); *G06F 2212/402* (2013.01); *G06F 2212/60* (2013.01)

(58) Field of Classification Search
CPC ... G06F 12/0804; G06F 12/0806; G06F 12/12
See application file for complete search history.

(56) References Cited

U.S. PATENT DOCUMENTS

| | | |
|---|---|---|
| 2006/0015749 A1 | 1/2006 | Mittal et al. |
| 2010/0281273 A1* | 11/2010 | Lee .................... G06F 21/72 713/190 |
| 2010/0332727 A1 | 12/2010 | Kapil et al. |

(Continued)

OTHER PUBLICATIONS

International Search Report received for PCT Patent Application No. PCT/US2016/063193, dated Aug. 22, 2017, 3 pages.

*Primary Examiner* — Edward J Dudek, Jr.

(57) ABSTRACT

Techniques to enable scalable cryptographically protected memory using on-chip memory are described. In one embodiment, an apparatus may comprise a processor component implemented on a first integrated circuit, an on-chip memory component implemented on the first integrated circuit, the on-chip memory component to include a memory page handler to manage memory pages stored on the on-chip memory component, and a cryptographic engine to encrypt and decrypt memory pages for the memory page handler, and an off-chip memory component implemented on a second integrated circuit coupled to the first integrated circuit, the off-chip memory component to store encrypted memory pages evicted from the on-chip memory component. Other embodiments are described and claimed.

25 Claims, 9 Drawing Sheets

(56) References Cited

U.S. PATENT DOCUMENTS

2010/0332850 A1* 12/2010 Boivie ................. G06F 21/125
                                                        713/189
2012/0124305 A1  5/2012 Weissman et al.
2012/0221785 A1  8/2012 Chung et al.
2016/0239685 A1  8/2016 Li et al.

* cited by examiner

600

Receive a memory page request at a memory page handler, the memory page handler stored in on-chip memory of a processing device for a computing device.
*602*

Determine that the memory page request corresponds to a requested memory page, the requested memory page stored in off-chip memory for the computing device.
*604*

Select an eviction memory page, the eviction memory page stored in the on-chip memory.
*606*

Encrypt the eviction memory page according to an encryption scheme to generate an encrypted eviction memory page.
*608*

Store the encrypted eviction memory page in the off-chip memory.
*610*

Retrieve the requested memory page from the off-chip memory.
*612*

Store the requested memory page in the in-chip memory.
*614*

Decrypt the requested memory page according to the encryption scheme to generate a decrypted requested memory page.
*616*

Respond to the memory page request based on the decrypted requested memory page.
*618*

*FIG. 6*

TECHNIQUES TO ENABLE SCALABLE CRYPTOGRAPHICALLY PROTECTED MEMORY USING ON-CHIP MEMORY

BACKGROUND

A computing platform may be subject to attacks that attempt to control, observe, or otherwise disrupt the operations of the computing platform. Such attacks may include physical attacks on the hardware platform. For example, off-chip hardware devices such as memory modules may be replaced—or off-chip storage otherwise corrupted—so as to empower an attacker to monitor, manipulate, or otherwise subvert the operations of the off-chip storage.

An attacker that gains control or access to a hardware platform may disrupt its proper operations to the detriment of its operator, user(s), and any other parties with which it may interact. For example, a compromised mobile device, such as a cellular telephone device, may have its communication interfered with or monitored. A compromised server device may have transactions performed by it corrupted or sabotaged. In general, the reliability of operations may be compromised, which may produce a variety of negative consequences.

BRIEF DESCRIPTION OF THE DRAWINGS

FIG. 6 illustrates an embodiment of a logic flow for the system of FIG. 1.

DETAILED DESCRIPTION

Figure 1:
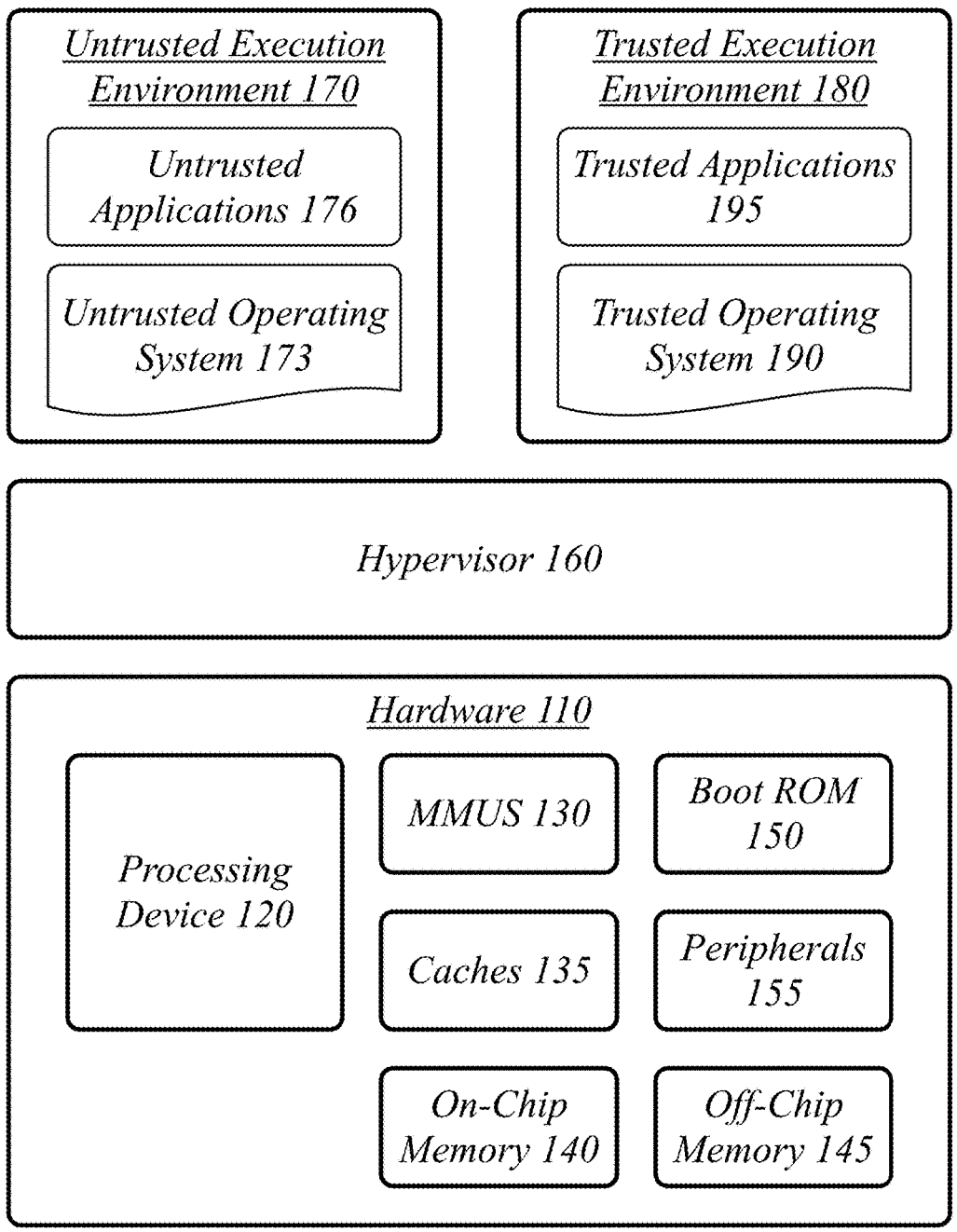
FIG. 1 illustrates an embodiment of a trusted execution system.

Various embodiments are generally directed to techniques to enable scalable cryptographically protected memory using on-chip memory. Some embodiments are particularly directed to techniques to enable scalable cryptographically protected memory using on-chip memory for execution of a trusted execution environment (TEE) protected from physical attacks.

A TEE may use cryptographic security to secure, verify, and attest to the security of an execution environment. The execution environment may comprise one or more processors and one more storage mediums. One storage medium may comprise an on-chip memory. An on-chip memory may be part of a combined integrated circuit (IC) with the one or more processors for a computing system.

On-chip memory may be implemented, though not exclusively, in a system on a chip (SoC) architecture. A SoC architecture may provide a portion of on-chip memory, such as static random-access memory (SRAM). However, this portion may be insufficient to store the operating memory of the operating system (OS) or operating systems and the one or more applications executing on a device. As such, the SoC may be coupled to off-chip memory, such as a portion of dynamic random-access memory (DRAM). This portion of off-chip memory may be substantially larger than the on-chip memory, such that the off-chip memory is sufficient to store the operating memory of the OS(s) and applications. It will be appreciated, however, that the techniques described herein may be in association with embodiments that use additional storage devices, such as flash drives or hard disks, for the storage of operating memory, such as where the operating memory exceeds the size of the on-chip memory and off-chip memory.

It may be impractical for attackers to directly subvert on-chip memory through physical interference due to the on-chip memory being integrated with the processor(s). However, the off-chip memory may be physically separable from the processor(s) and therefore at risk of physical interference by an attacker. The security of an execution environment may therefore be safeguarded through encryption of memory pages stored in the off-chip memory.

Some computing platforms provide hardware-based encryption of off-chip memory, such as through an embedded cryptographic engine that automatically encrypts and decrypts access to off-chip memory. However, many computing platforms do not provide software-based encryption of off-chip memory. It may therefore be desirable to use software techniques to provide, or supplement, encryption of off-chip memory and thereby enhance the security of a computing platform.

These software techniques may be implemented using the on-chip memory of a computing platform to manage the memory of the computing platform, and perform the encryption and decryption of access to off-chip memory. For instance, software instructions and at least some portion of the operating data structures of a memory page handler may be stored in the on-chip memory, providing a secure environment in which to carry out the operations providing for the security of off-chip memory. Examples of a memory page handler may include, without limitation, an OS page fault handler, a virtual machine (VM) exit handler for a VM hypervisor, and so forth. As a result, the embodiments can improve the security of an execution environment and extend the physical security of on-chip memory to off-chip memory.

In one embodiment, for example, an apparatus may comprise a processor component implemented on a first integrated circuit, an on-chip memory component implemented on the first integrated circuit, the on-chip memory component to include a memory page handler to manage memory pages stored on the on-chip memory component, and a cryptographic engine to encrypt and decrypt memory pages for the memory page handler, and an off-chip memory component implemented on a second integrated circuit coupled to the first integrated circuit, the off-chip memory component to store encrypted memory pages evicted from the on-chip memory component. Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a trusted execution system 100. In one embodiment, the trusted execution system 100 may comprise a computer-implemented system having software applications comprising one or more components. Although the trusted execution system 100 shown in FIG. 1 has a limited number of elements in a certain topology, it may be appreciated that the trusted execution system 100 may include more or less elements in alternate topologies as desired for a given implementation.

A trusted execution system 100 may be representative of a TEE implemented by a computing device. A computing device may comprise any electronic device capable of receiving, processing, and sending information for the trusted execution system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, wearable computers, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

A trusted execution system 100 may provide a plurality of execution environments, including an untrusted execution environment 170 and a trusted execution environment 180. An untrusted execution environment 170 may comprise, for example, an execution environment in which the security of the execution is not cryptographically guaranteed. A trusted execution environment 180 may comprise, for example, an execution environment in which the security of the section is cryptographically guaranteed. Each environment may comprise an operating system (OS), such as an untrusted operating system 173 and a trusted operating system 190.

In general, a trusted operating system 190 may provide stronger assurances as to security, but offer less features to the trusted applications 195 it supports, relative to an untrusted operating system 173. Similarly, an untrusted operating system 173 may provide weaker assurances as to security, but offer more features to the untrusted applications 176 it supports, relative to the trusted operating system 190. As such, the trusted operating system 190 may be used to support trusted applications 195 that provide key functions, such as providing for the communications of a computing device, for example. The untrusted operating system 173 may provide for user applications (e.g., apps on a mobile device), that may benefit from the providing of richer OS features and can accommodate the reduced guarantees of security.

A hypervisor 160 may execute on hardware 110, the hardware 110 comprising a plurality of components. The hardware 110 may comprise a processing device 120, which may comprise one or more processors. The hardware 110 may comprise one or more memory management units (MMUs) 130. The hardware 110 may comprise one or more caches 135. The hardware 110 may comprise on-chip memory 140. The on-chip memory 140 is part of a shared integrated circuit with the processing device 120. The hardware 110 may comprise off-chip memory 145. The off-chip memory 145 is one or more distinct integrated circuits from the processing device 120. The hardware 110 may comprise one or more peripherals 155 communicatively connected to the processing device 120. The hardware 110 may comprise a boot read-only memory (ROM) 150, the boot ROM 150 comprising instructions and data for the booting of the trusted execution system 100.

The processing device 120 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Each of the execution environments 170, 180 may comprise a virtual machine (VM). Each VM can have an underlying OS executing a set of applications running on each VM. Hence, a trusted VM will have a trusted OS 190 and a set of trusted services or trusted applications 195 executing on a trusted kernel. The untrusted VM can have a richer OS as an untrusted OS 173, such as Linux® or Microsoft Windows®, and a set of untrusted applications 176. Virtualization based security technologies rely on the isolation provided by a virtual machine monitor (VMM) from the applications executing on the other VMs. Each VM can have a region of memory partitioned for itself that is accessible only by that VM to ensure secure execution and secure storage of secrets like keys associated with the VM.

One of the most important security guarantees for the TEE is to protect the trusted OS 190 from any malicious software attacks. As such, the trusted OS 190 is stored in hidden or stolen physical memory ranges and is not visible to untrusted software and peripherals 155. When a trusted application is executed by the trusted OS 190, it is stored in the physical memory and is accessed via the trusted kernel in the system's TEE. Providing protection for the trusted applications 195 against hardware or physical attacks may be provided by the techniques described herein.

While the on-chip memory 140 can be used for secure operations due to its protection against physical tampering, a trusted OS 190 may used more operating memory than available in the on-chip memory 140. For instance, the on-chip memory 140 may be in the range of one-hundred twenty-eight (128) kilobytes (KB) to two (2) megabytes (MB), which may not be able to fit a full trusted OS 190 that may be of the order of several tens of MBs. As such, techniques to enable cryptographic protections for the trusted OS 190 using the off-chip memory 145 for storage, provided by code and structures executing in the on-chip memory 140, may empower secure execution of the trusted OS 190. Providing this secure execution using software techniques may make this secure execution available on hardware platforms without hardware-based encryption of the off-chip memory 145.

In one embodiment, for example, the off-chip memory 145 may be used to store the page fault handler (PFH) for the trusted OS 190 and/or the virtual machine exit handler (VMEH) for the hypervisor 160. A memory page handler (e.g., the PFH or the VM exit handler) may be stored in the on-chip memory 140 such that it never gets evicted and is always protected from physical attacks. Storing only the memory page handler in the on-chip memory 140 leaves the majority of the on-chip memory 140 for trusted OS 190 pages. While trusted OS 190 pages are resident in the on-chip memory 140, they are protected against physical tampering. However, when evicted, even though they are protected against software attacks by the protections of the trusted OS 190 and the hypervisor 160, they may still be vulnerable to hardware attacks like memory snooping.

In order to provide protection against hardware attacks, the techniques described herein implement a memory page handler with cryptographic primitives in software. As an example, the Advanced Encryption Standard (AES) encryption and decryption algorithms can be implement in the memory page handler. On a page eviction out of the on-chip memory 140, the memory page handler in addition to selecting the page for eviction also encrypts the page for eviction before storing it in of-chip memory 145. Similarly, on bringing a new page from off-chip memory 145, the memory page handler decrypts the page before installing it in the on-chip memory 140. This allows the pages to be protected against hardware attacks even when they are stored in off-chip memory 145. It will be appreciated that any appropriate cryptographic algorithm may be used and that AES is used here as one possible embodiment.

Figure 2:
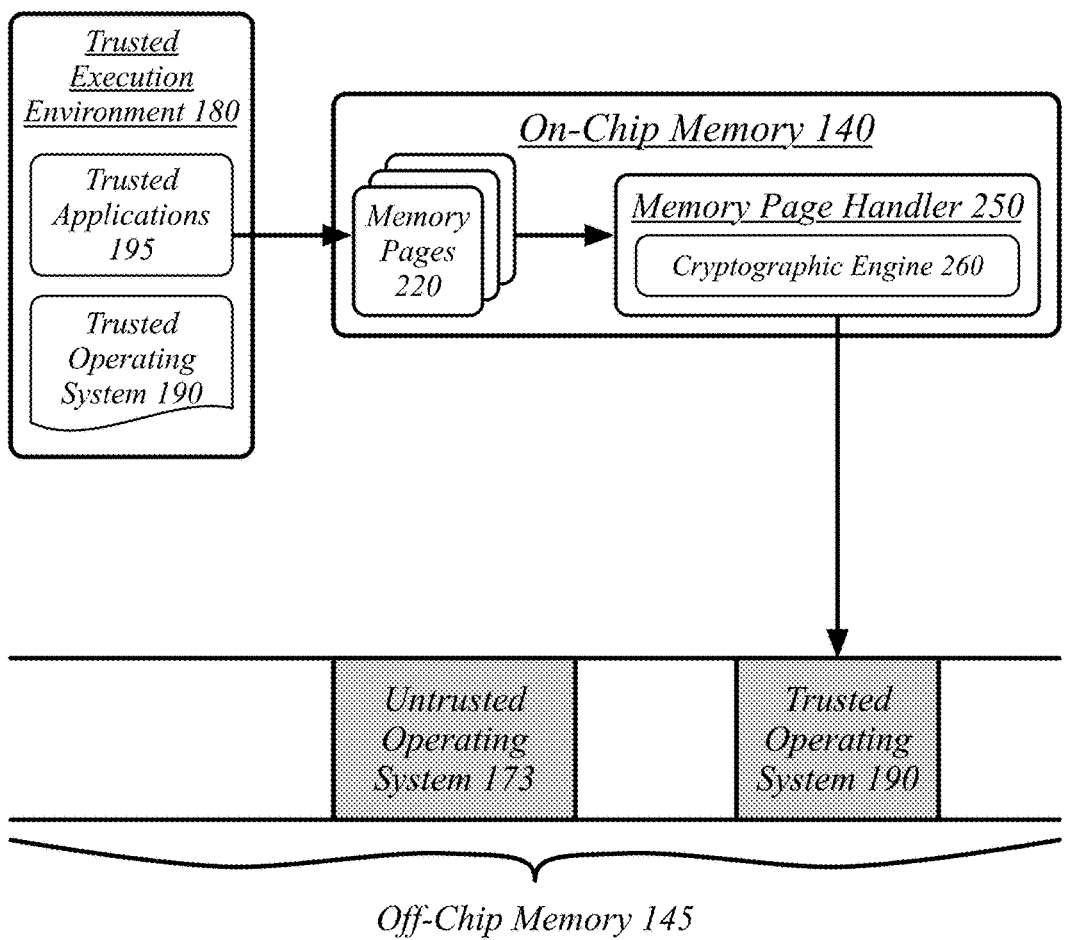
FIG. 2 illustrates an embodiment of memory page operations.

FIG. 2 illustrates an embodiment of memory page operations. FIG. 2 illustrates a more detailed block diagram for the trusted execution system 100.

As shown in FIG. 2, the trusted execution environment 180 may manage a set of memory pages 220 stored in the on-chip memory 140. The on-chip memory 140 may also implement a memory page handler 250, such as a PFH or VMEH.

The memory page handler 250 may implement a cryptographic engine 260. The cryptographic engine 260 may implement any suitable cryptographic techniques desired for a given level of security. In various embodiments, for example, the cryptographic engine 260 may implement one or more Advanced Encryption Standard (AES) encryption and decryption algorithms. In various embodiments, for example, the encryption scheme used by the cryptographic engine 260 may implement a tweakable encryption scheme. A tweakable encryption scheme may generally correspond to an encryption scheme in which the encryption may be primarily controlled according to an encryption key, but modified (e.g., tweaked) according to one or more tweaking parameters, as discussed with reference to FIG. 4. Embodiments are not limited to these examples.

When a trusted OS 190 makes a request to access a certain physical address in the memory for the trusted OS 190, the access is routed to the on-chip memory 140. The memory page handler 250 will check if the access is to one of the memory pages 220 stored in the on-chip memory 140. If so, the memory page handler 250 returns the data. Otherwise, the memory page handler 250 is responsible for getting the accessed page into the on-chip memory 140 from the off-chip memory 145.

When the memory page handler 250 evicts a memory page 220 from the on-chip memory 140 to the off-chip memory 145, the cryptographic engine 260 encrypts the memory page before it gets written to the physical memory. In this manner, the encrypted memory page 220 is safeguarded from hardware attacks. Similarly, when the memory page handler 260 retrieves a memory page 220 from the off-chip memory 145 to bring into the on-chip memory 140, the memory page handler 250 will use the cryptographic engine 260 to decrypt the contents of the memory page 220. In other words, the data is stored as plaintext in the on-chip memory 140 and is stored as ciphertext in the off-chip memory 145. Hence, the trusted OS 190 is protected against hardware attacks.

Figure 3:
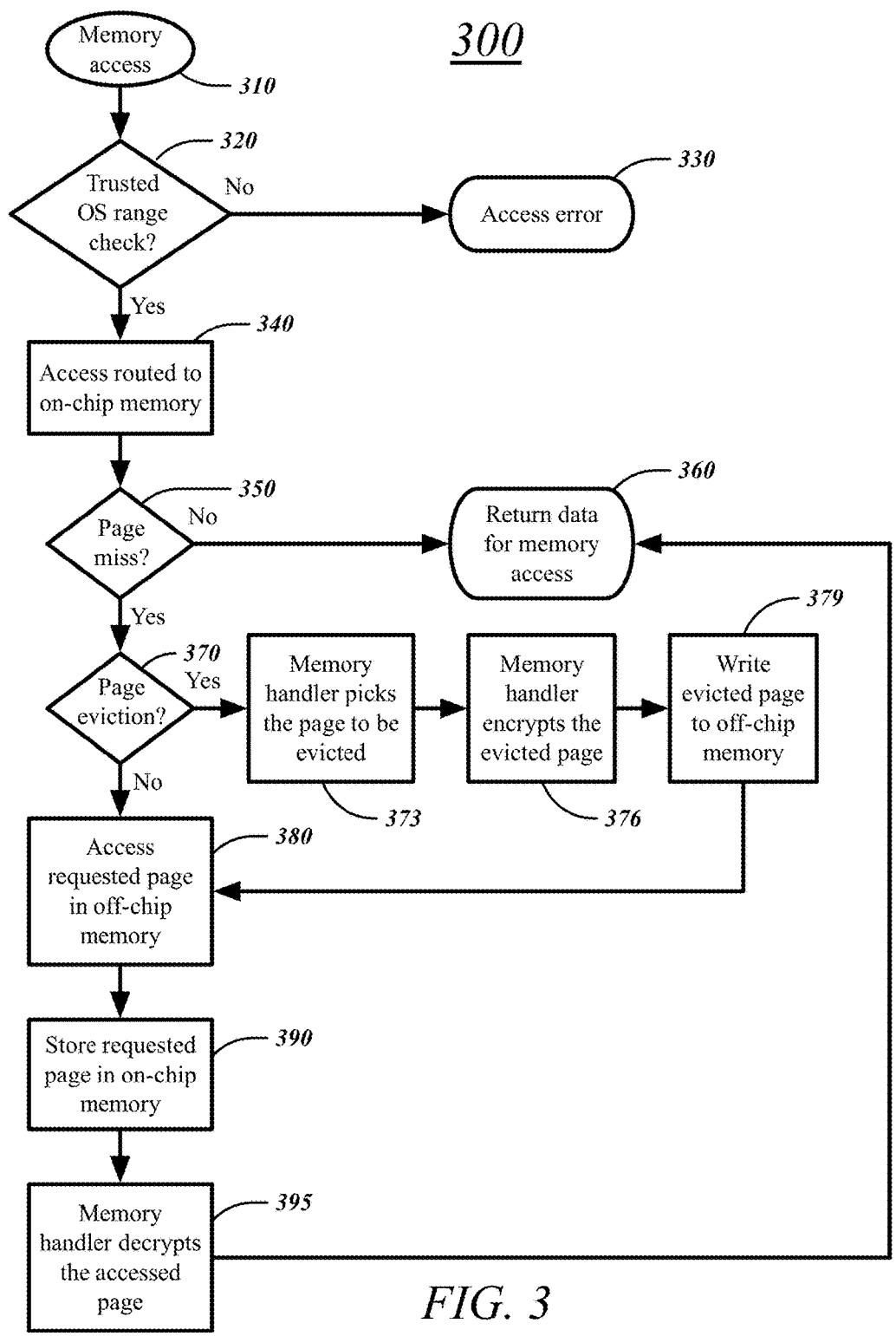
FIG. 3 illustrates an embodiment of a logic flow for responding to a memory access.

FIG. 3 illustrates an embodiment of a logic flow 300 for responding to a memory access. Logic flow 300 may correspond to logic that resides in the on-chip memory 140 that cannot be evicted. In other words, logic flow 300 may be implemented as logic that is locked in the on-chip memory 140.

The logic flow 300 may be initiated in response to a memory access at block 310. For example, the memory access may be a request from an application, such as the trusted OS 190.

The logic flow 300 may perform a trusted OS range check at block 320. The trusted OS range check may comprise the memory page handler 250 performing an address range check to ensure that the received access was targeting the trusted OS memory.

If the address range check is not within the trusted OS memory, the logic flow 300 may proceed to block 330. The logic flow 300 may raise an access error at block 330. An access error may comprise a refusal of the memory access and additional security measures.

If the address range check is within the trusted OS memory, the logic flow 300 may proceed to block 340. The logic flow 300 may route the memory access to the on-chip memory 140 at block 340. The logic flow 300 may then proceed to block 350.

The logic flow 300 may determine whether the memory access is a page hit or a page miss for the on-chip memory 140 at block 350. A page hit occurs where the memory access is to a page currently stored in the on-chip memory 140. A page miss occurs where the memory access is to a page not currently stored in the on-chip memory 140. On a page hit, the absence of a page miss, the logic flow 300 may proceed to block 360. The logic flow 300 may return the requested data for the requested memory access at block 360. On a page miss, the logic flow 300 may proceed to block 370.

The logic flow 300 may determine whether a memory page should be evicted at block 370. A memory page should be evicted if the on-chip memory 140 is full, lacking sufficient space for the storage of an additional memory page without performing an eviction. If a memory page should be evicted, the logic flow 300 may proceed to block 373. Otherwise, the logic flow 300 may proceed to block 380.

The logic flow 300 may include the memory page handler 250 picking a page to be evicted at block 373. It will be appreciated that any replacement policy may be used by the memory page handler 250, including least recently used (LRU), first-in first-out (FIFO), and so forth. The logic flow 300 may then proceed to block 376.

The logic flow 300 may include the memory page handler 250 encrypting the page for eviction at block 376. For instance, the memory page handler 250 may encrypt the page using AES encryption. The logic flow 300 may then proceed to block 379.

The logic flow 300 may write the evicted page to off-chip memory 143 at block 379. The eviction of the evicted page may be registered with a page table for the memory page handler 250. The logic flow 300 may then proceed to block 380.

If the memory page should not be evicted at block 370, or if the encrypted page is evicted to off-chip memory 145 at block 379, the logic flow 300 may access the requested page in the off-chip memory 145 at block 380. The logic flow 300 may then proceed to block 390.

The logic flow 300 may store the requested page in on-chip memory 140 at block 390. The storing of the requested page in the on-chip memory 140 may be registered with a page table for the memory page handler 250. The logic flow 300 may then proceed to block 395. The logic flow 300 may include the memory page handler 250 decrypting the access page at block 395. The logic flow 300 may then proceed to block 360.

Figure 4:
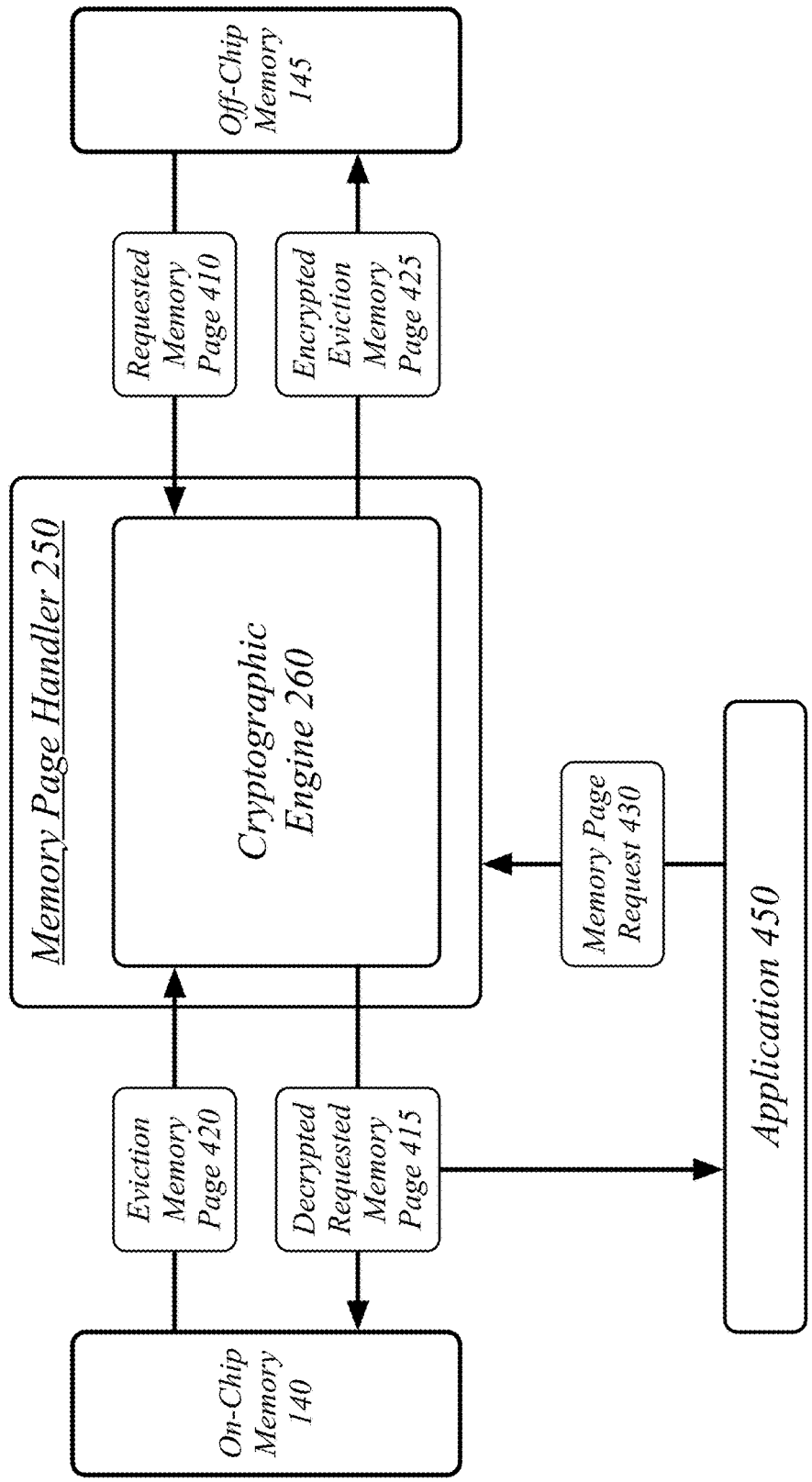
FIG. 4 illustrates an embodiment of memory page eviction and retrieval.

FIG. 4 illustrates an embodiment of a sample memory page eviction and retrieval. More particularly, FIG. 4 illustrates a more detailed block diagram of the trusted execution system 100 performing memory page eviction and retrieval.

As shown in FIG. 4, the memory page handler 250 may receive a memory page request 430. In some embodiments, the memory page handler 250 may comprise a page fault handler for a trusted operating system 190. In other embodiments, the memory page handler 250 may comprise a virtual machine exit handler for a trusted hypervisor 160.

The memory page request 430 may be received based on an attempted memory access by an application 450, such as one of the trusted applications 195 executing in a trusted execution environment 180. The memory page handler 250 may determine that the memory page request 430 corresponds to a requested memory page 410, the requested memory page 410 stored in the off-chip memory 145 in an encrypted form.

The memory page handler 250 may determine whether a memory page should be evicted from the on-chip memory 140 to make space available for the requested memory page 410. The memory page handler 250 may select an eviction memory page 420, the eviction memory page 420 stored in the on-chip memory 140. The memory page handler 250 may use a cryptographic engine 260 to encrypt the eviction memory page 420 according to an encryption scheme to generate an encrypted eviction memory page 425 and store the encrypted eviction memory page 425 in the off-chip memory 145.

The memory page handler 250 may retrieve the requested memory page 410 from the off-chip memory 145 now that the eviction of the eviction memory page 420 has freed space for the requested memory page 410. The memory page handler 250 may store the requested memory page 410 in the on-chip memory 140 after retrieval. The requested memory page 410 may be temporarily stored in its encrypted form.

The memory page handler 250 may decrypt the requested memory page 410 according to the encryption scheme used by the cryptographic engine 260 to generate a decrypted requested memory page 415. In some embodiments, the requested memory page 410 may be decrypted in place in the on-chip memory 140. In other embodiments, the requested memory page 410 may be decrypted as a stream as it is retrieved from the off-chip memory 145. The memory page handler 250 may then respond to the memory page request 430 based on the decrypted requested memory page 415.

In one embodiment, the encryption scheme used by the cryptographic engine 260 may comprise a tweakable encryption scheme. A tweakable encryption scheme may generally correspond to an encryption scheme in which the encryption may be primarily controlled according to an encryption key, but modified (e.g., tweaked) according to one or more tweaking parameters. These tweaking parameters may be used in combination with the encryption key to provide additional encryption protections. For instance, in order to prevent an attack in which the off-chip memory 145 has been compromised and is forced to return a different memory page than the one requested, the encryption scheme may incorporate the memory addresses for stored and retrieved memory pages in the encryption of the memory pages as a tweaking parameter. In some embodiments, the XTS mode of the Advanced Encryption Standard (AES) may be used as a tweakable encryption scheme. In some embodiments, the processing device 120 may include encryption-specific instructions, such as instructions for the AES standard, which may be used in the performance of cryptographic operations.

The memory page handler 250 may maintain a page table for tracking the status, location, and other information for memory pages. The root of the page table structure may be stored in the on-chip memory 140 persistently, pinned in the on-chip memory 140 for the duration of the up time of the computing device. However, one or more page table pages for the page table structure may be temporarily stored in the off-chip memory 145 so as to allow for a page table larger than can be, or can practically be, stored in the on-chip memory 140. This may allow for the management of off-chip memories of considerable size so long as a complete branch (root-to-leaf) of the page table can be stored in the on-chip memory 140, with portions of the page table outside the branch possibly stored in the off-chip memory 145 instead. As with any other memory page, the one or more page table pages may be encrypted for storage in the off-chip memory 145.

Direct-memory-access (DMA) devices may similarly have page tables associated with them. As with the primary page table, the root of a device page table for a DMA device would be stored in the on-chip memory 140, though portions of the page table pages may be encrypted and stored in the off-chip memory 145. The DMA devices may be configured to use the on-chip memory 140 for direct-memory access. The memory page handler 250 may move the pages for the device page tables between the on-chip memory 140 and the off-chip memory 145 using the techniques described herein for memory page management.

The memory page handler 250 may verify a requested memory page version for the requested memory page 410 prior to responding to the memory page request 430 based on the decrypted requested memory page 415. The memory page handler 250 may use page version control identifiers to verify that retrieved memory pages correspond to the most recent version stored in the off-chip memory 145. This may prevent, for example, replay attacks by an attacker in which an older version of a memory page is provided in response to a retrieval of a memory page from the off-chip memory. The memory page handler 250 may generate an eviction memory page version control identifier for the eviction memory page 420 and store the eviction memory page version control identifier in association with the eviction memory page 420.

In some embodiments, the eviction memory page version control identifier may comprise a version number for the memory page, which may be incremented with each transition of the memory page from the on-chip memory 140 to the off-chip memory 145. In these embodiments, the eviction memory page version control identifier may be used to tweak the encryption scheme as part of encrypting the eviction memory page. In other embodiments, the eviction memory page version control identifier may comprise a hash of one of the eviction memory page 420 and the encrypted eviction memory page 425. In these embodiments, the memory page handler 250 may store the eviction memory page version control identifier in a memory page version control structure, the root of which may be pinned in the on-chip memory 140, with additional pages moved in and out of the on-chip memory 140 as needed. Alternatively, the memory page handler 250 may store the eviction memory page version control identifier in an optional field of the page table structure. On a version control mismatch, a replay attack may be detected and errors and other procedures raised to respond to the detected attack.

Figure 5:
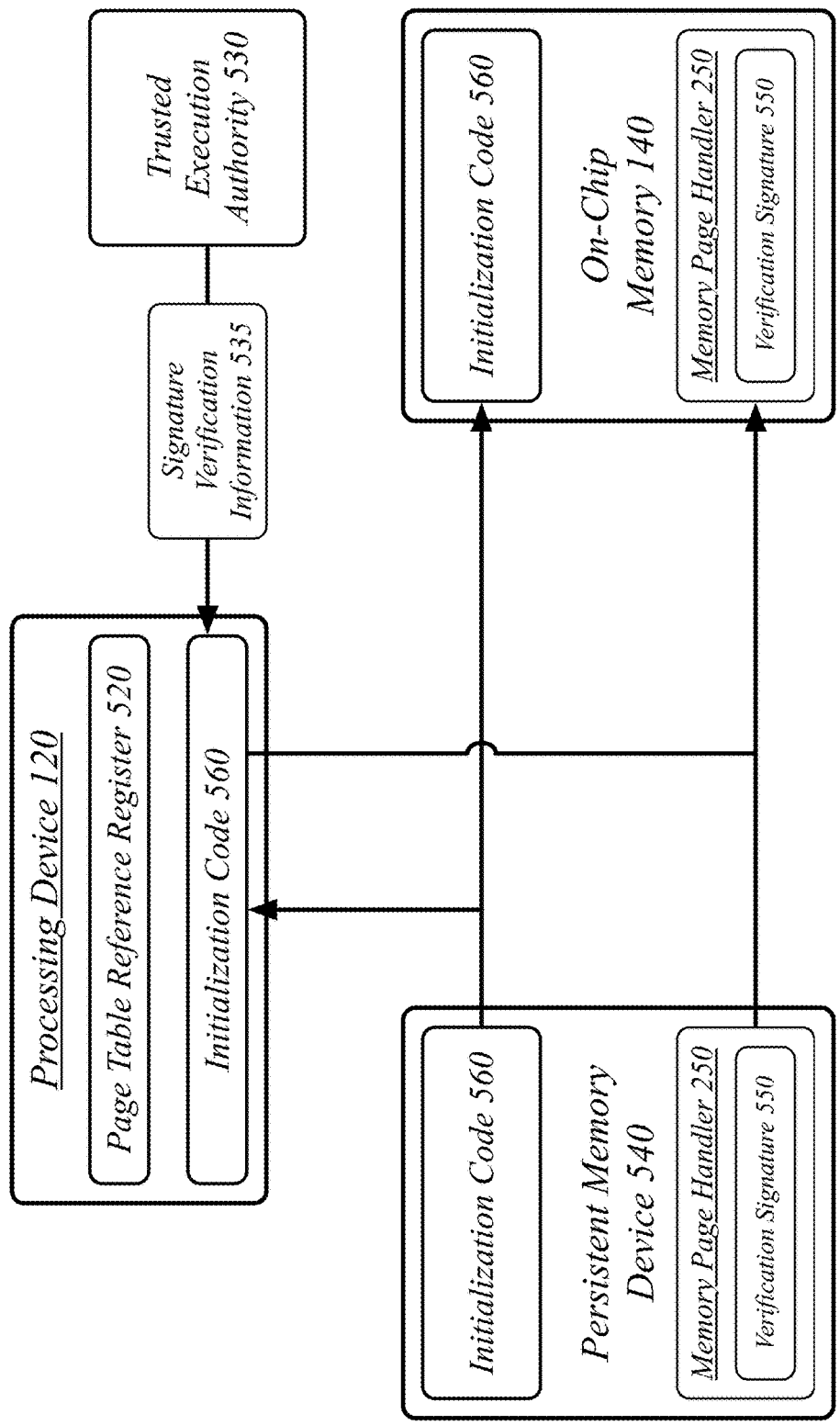
FIG. 5 illustrates an embodiment of a trusted execution authority supporting trusted execution attestation.

FIG. 5 illustrates an embodiment of a trusted execution authority 530 supporting trusted execution attestation.

Trusted execution attestation may comprise the use of cryptographic credentials to verify to a third-party that cryptographic and other security measures have been taken to provide for the security of a trusted execution environment 180. In some embodiments, trusted execution attestation may incorporate cryptographic credentials provided by a trusted execution authority 530. A trusted execution authority 530 may, in some cases, correspond to a software and/or hardware provider for at least some portion of the trusted execution system 100.

A persistent memory device 540, such as may correspond to the boot ROM 150, may store initialization code 560. The persistent memory device 540 may comprise, without limitation, a read-only persistent memory device 540 (e.g., a ROM) or a rewritable persistent memory device (e.g., flashable persistent memory). The initialization code 560 may be loaded into the on-chip memory 140 for execution as an initialization module from the persistent memory device 540 and be executed by a processing device 120. The loading and execution of the initialization code 560 may be performed using bootstrap techniques that empower the verification and security of the initialization code 560.

The persistent memory device 540 may store the memory page handler 250. The memory page handler 250 may be signed by a verification signature 550. The initialization code 560 may load the memory page handler 250 from the persistent memory device 540 into the on-chip memory 140, where it is available for execution by the processing device 120. The initialization code 560 may then register the memory page handler 350, now located in the on-chip memory 140, for page fault handling with the processing device 120. For instance, the processing device 120 may have a page table reference register 520 for storing the address for the page table or the code for execution on a memory access or page miss.

The loading of the memory page handler 250 into the on-chip memory 140 may be verified according to a verification signature 550. The memory page handler 250 may have a verification signature 550 attached to it, the verification signature comprising a cryptographic signing of the code for the memory page handler 250. For instance, a verification signature 550 may be generated for the memory page handler 250 by the trusted execution authority 530 through the application of a private key to the code for the memory page handler 250. The trusted execution authority 5430 may provide signature verification information 535 for use in verifying the memory page handler 250. The signature verification information 535 may comprise a public key for a public/private encryption key corresponding to the private key used to generate the verification signature 550. The initialization code 560 may confirm that the public key can be used on the verification signature 550 to verify the loaded code for the memory page handler 250, thereby confirming that the code for the memory page handler 250 has not been tampered with. The verification of the memory page handler 250 may be used as a component of attesting to a trusted execution environment to a third-party application. A trusted OS 190 may attest to the trusted applications 195 that the memory page handler 250 was securely loaded based on the verification using the verification signature 550.

In some embodiments, the memory page handler 250 may generate an encryption key in response to a boot of the computing device. The encryption key may be used by the encryption scheme implemented by the cryptographic engine 260 to encrypt and decrypt memory pages stored in the off-chip memory 145. The encryption key may be maintained for only a single boot cycle of a computing device, discarded on a shutdown or reboot of the computing device. As such, the encryption key may be exclusively stored in the on-chip memory 140—or other on-chip storage, such as registers of the processing device 120 and on-chip caches—and never written to the off-chip memory 145, so as to avoid its interception by attackers.

Communication with a trusted execution authority 530 may be implemented using any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). Communication may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media may include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a memory page request at a memory page handler, the memory page handler stored in on-chip memory of a processing device for a computing device at block 602.

As show in FIG. 6, the logic flow 600 may determine that the memory page request corresponds to a requested memory page, the requested memory page stored in off-chip memory for the computing device at block 604. The logic flow 600 may select an eviction memory page, the eviction memory page stored in the on-chip memory at block 606. The logic flow 600 may encrypt the eviction memory page according to an encryption scheme to generate an encrypted eviction memory page at block 608. The logic flow 600 may store the encrypted eviction memory page in the off-chip memory at block 610. The logic flow 600 may retrieve the requested memory page from the off-chip memory at block 612. The logic flow 600 may store the requested memory page in the in-chip memory at block 614. The logic flow 600 may decrypt the requested memory page according to the encryption scheme to generate a decrypted requested memory page at block 616. The logic flow 600 may respond to the memory page request based on the decrypted requested memory page at block 618. The embodiments are not limited to this example.

Figure 7:
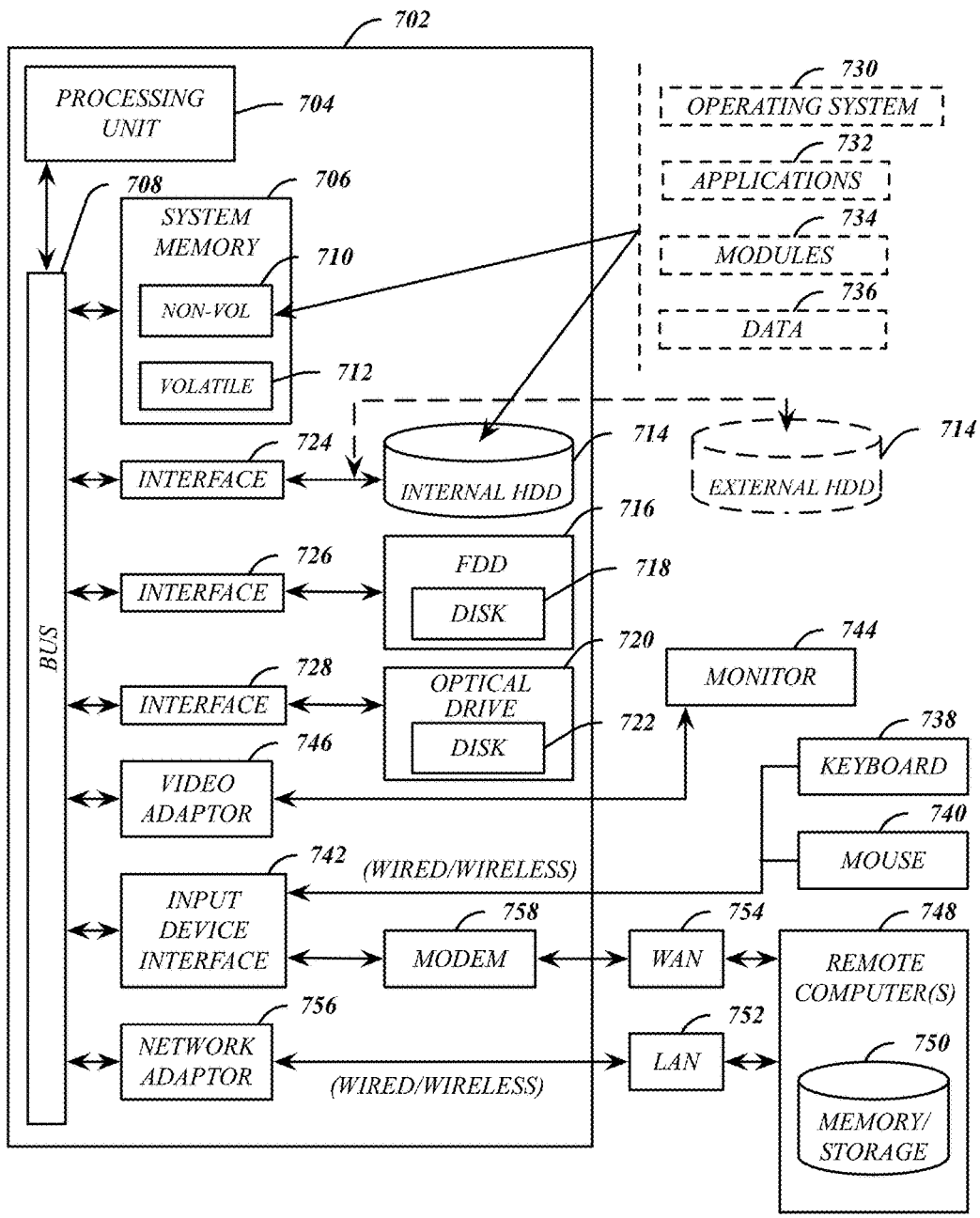
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 1, 4, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the trusted execution system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.7x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
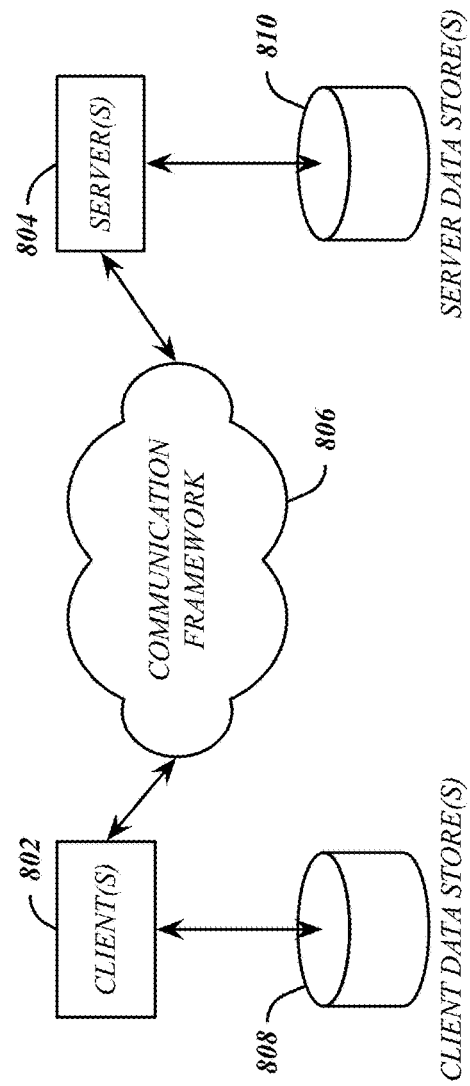
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the computing device described with reference to FIG. 1 and others. The servers 804 may implement server devices for the trusted execution authority 530. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
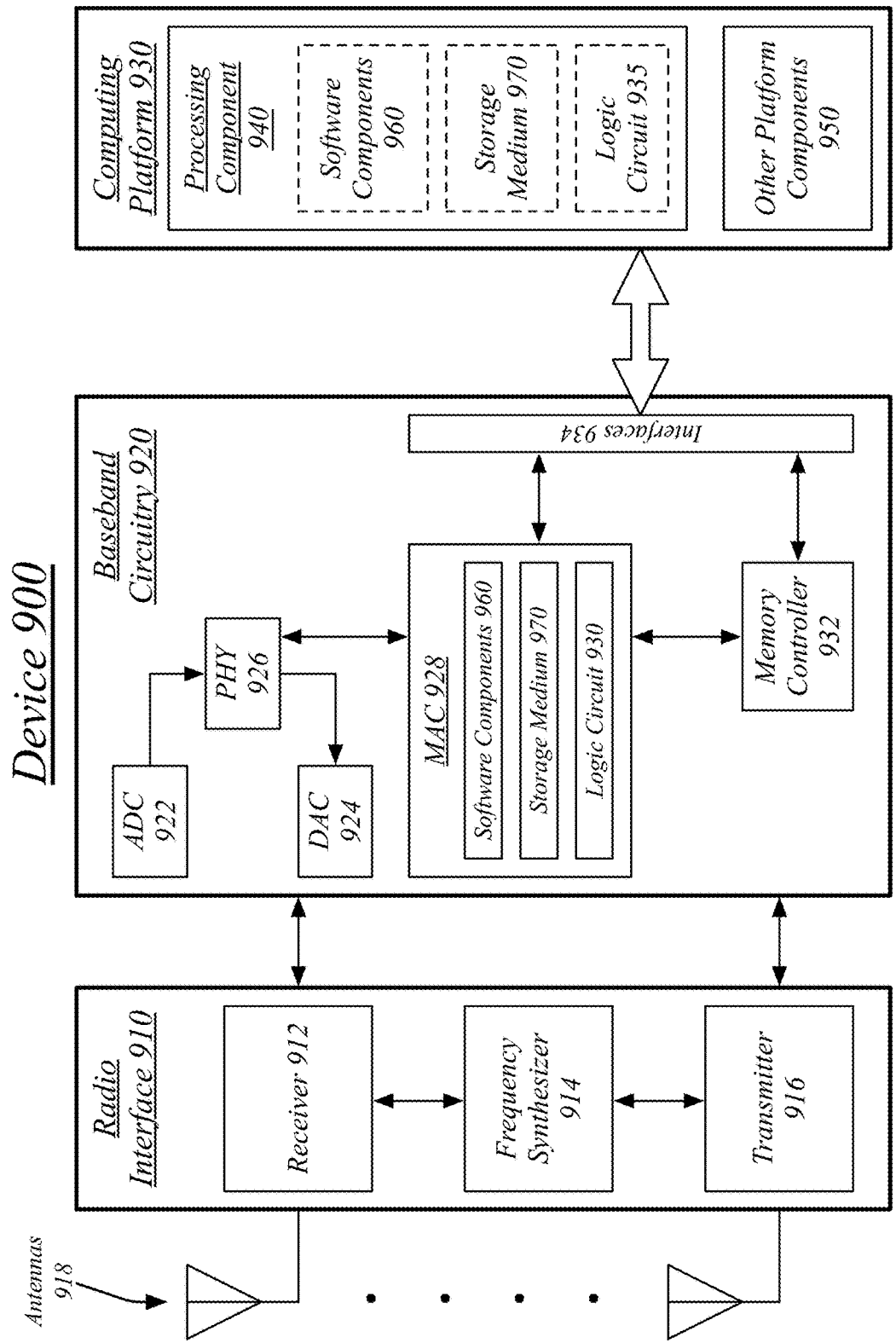
FIG. 9 illustrates an embodiment of a radio device architecture.

FIG. 9 illustrates an embodiment of a device 900 for use in a multicarrier OFDM system, such as the trusted execution system 100. Device 900 may implement, for example, software components 960 as described with reference to trusted execution system 100 and/or a logic circuit 935. The logic circuit 935 may include physical circuits to perform operations described for the trusted execution system 100. As shown in FIG. 9, device 900 may include a radio interface 910, baseband circuitry 920, and computing platform 930, although embodiments are not limited to this configuration.

The device 900 may implement some or all of the structure and/or operations for the trusted execution system 100 and/or logic circuit 935 in a single computing entity, such as entirely within a single device. Alternatively, the device 900 may distribute portions of the structure and/or operations for the trusted execution system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the trusted execution system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Example 1 is an apparatus may comprise a processor component implemented on a first integrated circuit; an on-chip memory component implemented on the first integrated circuit, the on-chip memory component to include a memory page handler to manage memory pages stored on the on-chip memory component, and a cryptographic engine to encrypt and decrypt memory pages for the memory page handler; and an off-chip memory component implemented on a second integrated circuit coupled to the first integrated circuit, the off-chip memory component to store encrypted memory pages evicted from the on-chip memory component.

Example 2 includes the subject matter of Example 1, further comprising the memory page handler to select an eviction memory page stored in the on-chip memory component, encrypt the eviction memory page according to an encryption scheme to generate an encrypted eviction memory page, and store the encrypted eviction memory page in the off-chip memory component.

Example 3 includes the subject matter of Example 1, the memory page handler to receive a memory page request, determine that the memory page request corresponds to a requested memory page stored in the off-chip memory component, retrieve a requested memory page from the off-chip memory component, decrypt the requested memory page to generate a decrypted requested memory page, and respond to a memory page request based on the decrypted requested memory page.

Example 4 includes the subject matter of Example 1, further comprising the memory page handler to receive a memory page request, determine that the memory page request corresponds to a requested memory page stored in the off-chip memory component, select an eviction memory page stored in the on-chip memory component, encrypt the eviction memory page according to an encryption scheme to generate an encrypted eviction memory page, store the encrypted eviction memory page in the off-chip memory component, retrieve the requested memory page from the off-chip memory component, decrypt the requested memory page according to the encryption scheme to generate a decrypted requested memory page, and respond to the memory page request based on the decrypted requested memory page.

Example 5 includes the subject matter of Example 4, the memory page handler to select the eviction memory page according to a least-recently-used page eviction scheme.

Example 6 includes the subject matter of Example 1, further comprising an initialization module to load the memory page handler into the on-chip memory component; and register the memory page handler in the on-chip memory component for page fault handling with the processing component.

Example 7 includes the subject matter of Example 1, further comprising a persistent memory device; and an initialization module to load the memory page handler into the on-chip memory from the persistent memory device.

Example 8 includes the subject matter of Example 7, the persistent memory device comprising one of a read-only persistent memory device and a rewritable persistent memory device.

Example 9 includes the subject matter of Example 6, the initialization module to verifying loading of the memory page handler according to a verification signature.

Example 10 includes the subject matter of Example 9, the verification signature signed by an encryption key of a trusted execution authority.

Example 11 includes the subject matter of Example 10, further comprising a trusted operating system to attest to a trusted execution environment to a third-party application based on verifying loading of the memory page handler according to the verification signature.

Example 12 includes the subject matter of Example 1, the memory page handler comprising a page fault handler for a trusted operating system.

Example 13 includes the subject matter of Example 1, the memory page handler comprising a virtual machine exit handler for a trusted hypervisor.

Example 14 includes the subject matter of Example 1, the cryptographic engine to implement an encryption scheme comprising a tweakable encryption scheme.

Example 15 includes the subject matter of Example 4, the cryptographic engine to implement an encryption scheme incorporating a first memory address for the requested memory page and a second memory address for the eviction memory page.

Example 16 includes the subject matter of Example 1, the memory page handler to generate an encryption key in response to a boot of a computing device, the encryption key used by an encryption scheme implemented by the cryptographic engine.

Example 17 includes the subject matter of Example 1, the memory page handler to store a root of a page table structure for the memory page handler in the on-chip memory component.

Example 18 includes the subject matter of Example 17, the memory page handler to store one or more page table pages for the page table structure in the off-chip memory, the one or more page tables pages encrypted for storage in the off-chip memory.

Example 19 includes the subject matter of Example 1, the memory page handler to store a root of a device page table for a direct-memory-access device in the on-chip memory.

Example 20 includes the subject matter of Example 1, the first and second integrated circuits implemented by a computing device, the computing device including a communications component, an input/output (I/O) component, and an electronic display.

Example 21 includes the subject matter of Example 4, the memory page handler to verify a requested memory page version for the requested memory page prior to responding to the memory page request based on the decrypted requested memory page.

Example 22 includes the subject matter of Example 4, further comprising the memory page handler to generate an eviction memory page version control identifier for the eviction memory page; and store the eviction memory page version control identifier in association with the eviction memory page.

Example 23 include the subject matter of Example 22, the eviction memory page version control identifier used to tweak the encryption scheme as part of encrypting the eviction memory page.

Example 24 includes the subject matter of Example 22, the eviction memory page version control identifier comprising a hash of one of the eviction memory page and the encrypted eviction memory page, further comprising: the memory page handler to store the eviction memory page version control identifier in a memory page version control structure.

Example 25 is a computer-implemented method that may comprise receiving a memory page request at a memory page handler, the memory page handler stored in on-chip memory of a processing device for a computing device; determining that the memory page request corresponds to a requested memory page, the requested memory page stored in off-chip memory for the computing device; selecting an eviction memory page, the eviction memory page stored in the on-chip memory; encrypting the eviction memory page according to an encryption scheme to generate an encrypted eviction memory page; and storing the encrypted eviction memory page in the off-chip memory.

Example 26 includes the subject matter of Example 25, comprising retrieving the requested memory page from the off-chip memory; storing the requested memory page in the in-chip memory; decrypting the requested memory page according to the encryption scheme to generate a decrypted requested memory page; and responding to the memory page request based on the decrypted requested memory page.

Example 27 includes the subject matter of Example 25, further comprising loading the memory page handler into the on-chip memory of the processing device; and registering the memory page handler in the on-chip memory for page fault handling with the processing device.

Example 28 includes the subject matter of Example 25, further comprising loading the memory page handler into the on-chip memory from a persistent memory device.

Example 29 includes the subject matter of Example 28, the persistent memory device comprising one of a read-only persistent memory device and a rewritable persistent memory device.

Example 30 includes the subject matter of Example 27, further comprising verifying loading of the memory page handler according to a verification signature.

Example 31 includes the subject matter of Example 30, the verification signature signed by an encryption key of a trusted execution authority.

Example 32 includes the subject matter of Example 31, further comprising attesting to a trusted execution environment to a third-party application based on verifying loading of the memory page handler according to the verification signature.

Example 33 includes the subject matter of Example 25, the memory page handler comprising a page fault handler for a trusted operating system.

Example 34 includes the subject matter of Example 25, the memory page handler comprising a virtual machine exit handler for a trusted hypervisor.

Example 35 includes the subject matter of Example 25, the eviction memory page selected according to a least-recently-used page eviction scheme.

Example 36 includes the subject matter of Example 25, the encryption scheme incorporating a first memory address for the requested memory page and a second memory address for the eviction memory page.

Example 37 includes the subject matter of Example 25, further comprising generating an encryption key in response to a boot of the computing device, the encryption key used by the encryption scheme.

Example 38 includes the subject matter of Example 25, a root of a page table structure for the memory page handler stored in the on-chip memory.

Example 39 includes the subject matter of Example 38, comprising storing one or more page table pages for the page table structure in the off-chip memory, the one or more page tables pages encrypted for storage in the off-chip memory.

Example 40 includes the subject matter of Example 25, a root of a device page table for a direct-memory-access device stored in the on-chip memory.

Example 41 includes the subject matter of Example 25, comprising verifying a requested memory page version for the requested memory page prior to responding to the memory page request based on the decrypted requested memory page.

Example 42 includes the subject matter of Example 25, further comprising generating an eviction memory page version control identifier for the eviction memory page; and storing the eviction memory page version control identifier in association with the eviction memory page.

Example 43 includes the subject matter of Example 42, the eviction memory page version control identifier used to tweak the encryption scheme as part of encrypting the eviction memory page.

Example 44 includes the subject matter of Example 42, the eviction memory page version control identifier comprising a hash of one of the eviction memory page and the encrypted eviction memory page, further comprising: storing the eviction memory page version control identifier in a memory page version control structure.

Example 45 is at least one computer-readable storage medium comprising instructions that, when executed, cause a system to: receive a memory page request at a memory page handler, the memory page handler stored in on-chip memory of a processing device for a computing device; determine that the memory page request corresponds to a requested memory page, the requested memory page stored in off-chip memory for the computing device; select an eviction memory page, the eviction memory page stored in the on-chip memory; encrypt the eviction memory page according to an encryption scheme to generate an encrypted eviction memory page; store the encrypted eviction memory page in the off-chip memory; retrieve the requested memory page from the off-chip memory; store the requested memory page in the in-chip memory; decrypt the requested memory page according to the encryption scheme to generate a decrypted requested memory page; and respond to the memory page request based on the decrypted requested memory page.

Example 46 includes the subject matter of Example 45, comprising further instructions that, when executed, cause a system to: load the memory page handler into the on-chip memory of the processing device; and register the memory page handler in the on-chip memory for page fault handling with the processing device.

Example 47 includes the subject matter of Example 45, comprising further instructions that, when executed, cause a system to: load the memory page handler into the on-chip memory from a persistent memory device.

Example 48 includes the subject matter of Example 47, the persistent memory device comprising one of a read-only persistent memory device and a rewritable persistent memory device.

Example 49 includes the subject matter of Example 47, comprising further instructions that, when executed, cause a system to: verify loading of the memory page handler according to a verification signature.

Example 50 includes the subject matter of Example 49 the verification signature signed by an encryption key of a trusted execution authority.

Example 51 includes the subject matter of Example 49, comprising further instructions that, when executed, cause a system to: attest to a trusted execution environment to a third-party application based on verifying loading of the memory page handler according to the verification signature.

Example 52 includes the subject matter of Example 45, the memory page handler comprising a page fault handler for a trusted operating system.

Example 53 includes the subject matter of Example 45, the memory page handler comprising a virtual machine exit handler for a trusted hypervisor.

Example 54 includes the subject matter of Example 45, the eviction memory page selected according to a least-recently-used page eviction scheme.

Example 55 includes the subject matter of Example 45, the encryption scheme incorporating a first memory address for the requested memory page and a second memory address for the eviction memory page.

Example 56 includes the subject matter of Example 45, comprising generating an encryption key in response to a boot of the computing device, the encryption key used by the encryption scheme.

Example 57 includes the subject matter of Example 45, a root of a page table structure for the memory page handler stored in the on-chip memory.

Example 58 includes the subject matter of Example 57, comprising further instructions that, when executed, cause a system to: store one or more page table pages for the page table structure in the off-chip memory, the one or more page tables pages encrypted for storage in the off-chip memory.

Example 59 includes the subject matter of Example 45, a root of a device page table for a direct-memory-access device stored in the on-chip memory.

Example 60 includes the subject matter of Example 45, comprising further instructions that, when executed, cause a system to verify a requested memory page version for the requested memory page prior to responding to the memory page request based on the decrypted requested memory page.

Example 61 includes the subject matter of Example 45, comprising further instructions that, when executed, cause a system to: generate an eviction memory page version control identifier for the eviction memory page; and store the eviction memory page version control identifier in association with the eviction memory page.

Example 62 includes the subject matter of Example 61, the eviction memory page version control identifier used to tweak the encryption scheme as part of encrypting the eviction memory page.

Example 63 includes the subject matter of Example 61, the eviction memory page version control identifier comprising a hash of one of the eviction memory page and the encrypted eviction memory page, comprising further instructions that, when executed, cause a system to: store the eviction memory page version control identifier in a memory page version control structure.

Example 64 comprise an apparatus, comprising: means for receiving a memory page request at a memory page handler, the memory page handler stored in on-chip memory of a processing device for a computing device; means for determining that the memory page request corresponds to a requested memory page, the requested memory page stored in off-chip memory for the computing device; means for selecting an eviction memory page, the eviction memory page stored in the on-chip memory; means for encrypting the eviction memory page according to an encryption scheme to generate an encrypted eviction memory page; and means for storing the encrypted eviction memory page in the off-chip memory.

Example 65 includes the subject matter of Example 64, comprising: means for retrieving the requested memory page from the off-chip memory; means for storing the requested memory page in the in-chip memory; means for decrypting the requested memory page according to the encryption scheme to generate a decrypted requested memory page; and means for responding to the memory page request based on the decrypted requested memory page.

Example 66 includes the subject matter of Example 64, further comprising: means for loading the memory page handler into the on-chip memory of the processing device; and means for registering the memory page handler in the on-chip memory for page fault handling with the processing device.

Example 67 includes the subject matter of Example 64, further comprising: means for loading the memory page handler into the on-chip memory from a persistent memory device.

Example 68 includes the subject matter of Example 68, the persistent memory device comprising one of a read-only persistent memory device and a rewritable persistent memory device.

Example 69 includes the subject matter of Example 68, further comprising: means for verifying loading of the memory page handler according to a verification signature.

Example 70 includes the subject matter of Example 69, the verification signature signed by an encryption key of a trusted execution authority.

Example 71 includes the subject matter of Example 69, further comprising: means for attesting to a trusted execution environment to a third-party application based on verifying loading of the memory page handler according to the verification signature.

Example 72 includes the subject matter of Example 64, the memory page handler comprising a page fault handler for a trusted operating system.

Example 73 includes the subject matter of Example 64, the memory page handler comprising a virtual machine exit handler for a trusted hypervisor.

Example 74 includes the subject matter of Example 64, the eviction memory page selected according to a least-recently-used page eviction scheme.

Example 75 includes the subject matter of Example 64, the encryption scheme incorporating a first memory address for the requested memory page and a second memory address for the eviction memory page.

Example 76 includes the subject matter of Example 64, comprising generating an encryption key in response to a boot of the computing device, the encryption key used by the encryption scheme.

Example 77 includes the subject matter of Example 64, a root of a page table structure for the memory page handler stored in the on-chip memory.

Example 78 includes the subject matter of Example 77, comprising means for storing one or more page table pages for the page table structure in the off-chip memory, the one or more page tables pages encrypted for storage in the off-chip memory.

Example 79 includes the subject matter of Example 64, a root of a device page table for a direct-memory-access device stored in the on-chip memory.

Example 80 includes the subject matter of Example 64, comprising means for verifying a requested memory page version for the requested memory page prior to responding to the memory page request based on the decrypted requested memory page.

Example 81 includes the subject matter of Example 64, further comprising: means for generating an eviction memory page version control identifier for the eviction memory page; and means for storing the eviction memory page version control identifier in association with the eviction memory page.

Example 82 includes the subject matter of Example 81, the eviction memory page version control identifier used to tweak the encryption scheme as part of encrypting the eviction memory page.

Example 83 includes the subject matter of Example 81, the eviction memory page version control identifier comprising a hash of one of the eviction memory page and the encrypted eviction memory page, further comprising: means for storing the eviction memory page version control identifier in a memory page version control structure.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor component implemented on a first integrated circuit;
an on-chip memory component implemented on the first integrated circuit, the on-chip memory component to include a memory page handler to manage memory pages stored on the on-chip memory component, and a cryptographic engine to encrypt and decrypt memory pages for the memory page handler, wherein the memory page handler is prevented from being evicted from the on-chip memory; and
an off-chip memory component implemented on a second integrated circuit coupled to the first integrated circuit, the off-chip memory component to store encrypted memory pages evicted from the on-chip memory component.

2. The apparatus of claim 1, the memory page handler to select an eviction memory page stored in the on-chip memory component, encrypt the eviction memory page according to an encryption scheme to generate an encrypted eviction memory page, and store the encrypted eviction memory page in the off-chip memory component.

3. The apparatus of claim 1, the memory page handler to receive a memory page request, determine that the memory page request corresponds to a requested memory page stored in the off-chip memory component, retrieve the requested memory page from the off-chip memory component, decrypt the requested memory page to generate a decrypted requested memory page, and respond to the memory page request based on the decrypted requested memory page.

4. The apparatus of claim 1, the memory page handler to receive a memory page request, determine that the memory page request corresponds to a requested memory page stored in the off-chip memory component, select an eviction memory page stored in the on-chip memory component, encrypt the eviction memory page according to an encryption scheme to generate an encrypted eviction memory page, store the encrypted eviction memory page in the off-chip memory component, retrieve the requested memory page from the off-chip memory component, decrypt the requested memory page according to the encryption scheme to generate a decrypted requested memory page, and respond to the memory page request based on the decrypted requested memory page.

5. The apparatus of claim 1, further comprising:
an initialization module to load the memory page handler into the on-chip memory component; and
register the memory page handler in the on-chip memory component for page fault handling with the processing component.

6. The apparatus of claim 1, the memory page handler comprising a page fault handler for a trusted operating system.

7. The apparatus of claim 1, the memory page handler comprising a virtual machine exit handler for a trusted hypervisor.

8. The apparatus of claim 4, the encryption scheme implemented to incorporate a first memory address for the requested memory page and a second memory address for the eviction memory page.

9. The apparatus of claim 1, the memory page handler to generate an encryption key in response to a boot of a computing device, the encryption key used by an encryption scheme implemented by the cryptographic engine.

10. The apparatus of claim 1 the memory page handler to store a root of a page table structure for the memory page handler in the on-chip memory component.

11. The apparatus of claim 1, the first and second integrated circuits implemented by a computing device, the computing device including a communications component, an input/output (I/O) component, and an electronic display.

12. A computer-implemented method, comprising:
    receiving a memory page request at a memory page handler, the memory page handler stored in on-chip memory of a processing device for a computing device, wherein the memory page handler is prevented from being evicted from the on-chip memory;
    determining that the memory page request corresponds to a requested memory page, the requested memory page stored in off-chip memory for the computing device;
    selecting an eviction memory page, the eviction memory page stored in the on-chip memory;
    encrypting the eviction memory page according to an encryption scheme to generate an encrypted eviction memory page; and
    storing the encrypted eviction memory page in the off-chip memory.

13. The computer-implemented method of claim 12, comprising:
    retrieving the requested memory page from the off-chip memory;
    storing the requested memory page in the on-chip memory;
    decrypting the requested memory page according to the encryption scheme to generate a decrypted requested memory page; and
    responding to the memory page request based on the decrypted requested memory page.

14. The computer-implemented method of claim 12, further comprising:
    loading the memory page handler into the on-chip memory of the processing device; and
    registering the memory page handler in the on-chip memory for page fault handling with the processing device.

15. The computer-implemented method of claim 12, the encryption scheme incorporating a first memory address for the requested memory page and a second memory address for the eviction memory page.

16. The computer-implemented method of claim 12, comprising generating an encryption key in response to a boot of the computing device, the encryption key used by the encryption scheme.

17. The computer-implemented method of claim 13, comprising verifying a requested memory page version for the requested memory page prior to responding to the memory page request based on the decrypted requested memory page.

18. At least one computer-readable storage medium comprising instructions that, when executed, cause a system to:
    receive a memory page request at a memory page handler, the memory page handler stored in on-chip memory of a processing device for a computing device, wherein the memory page handler is prevented from being evicted from the on-chip memory;
    determine that the memory page request corresponds to a requested memory page, the requested memory page stored in off-chip memory for the computing device;
    select an eviction memory page, the eviction memory page stored in the on-chip memory;
    encrypt the eviction memory page according to an encryption scheme to generate an encrypted eviction memory page;
    store the encrypted eviction memory page in the off-chip memory;
    retrieve the requested memory page from the off-chip memory;
    store the requested memory page in the on-chip memory;
    decrypt the requested memory page according to the encryption scheme to generate a decrypted requested memory page; and
    respond to the memory page request based on the decrypted requested memory page.

19. The computer-readable storage medium of claim 18, comprising further instructions that, when executed, cause the system to:
    load the memory page handler into the on-chip memory of the processing device; and
    register the memory page handler in the on-chip memory for page fault handling with the processing device.

20. The computer-readable storage medium of claim 18, the memory page handler comprising a page fault handler for a trusted operating system.

21. The computer-readable storage medium of claim 18, the memory page handler comprising a virtual machine exit handler for a trusted hypervisor.

22. The computer-readable storage medium of claim 18, the encryption scheme incorporating a first memory address for the requested memory page and a second memory address for the eviction memory page.

23. The computer-readable storage medium of claim 18, comprising further instructions that, when executed, cause the system to generate an encryption key in response to a boot of the computing device, the encryption key used by the encryption scheme.

24. The computer-readable storage medium of claim 18, a root of a page table structure for the memory page handler stored in the on-chip memory.

25. The computer-readable storage medium of claim 18, comprising further instructions that, when executed, cause the system to verify a requested memory page version for the requested memory page prior to responding to the memory page request based on the decrypted requested memory page.

* * * * *